United States Patent [19]

Gibb et al.

[11] Patent Number: 4,869,960
[45] Date of Patent: Sep. 26, 1989

[54] EPOXY NOVOLAC COATED CERAMIC PARTICULATE

[75] Inventors: James L. Gibb, Woodbury, Minn.; James A. Laird, St. Joseph, Wis.; Leslie G. Berntson, Minneapolis, Minn.

[73] Assignee: Minnesota Mining and Manufacturing Company, St. Paul, Minn.

[21] Appl. No.: 97,871

[22] Filed: Sep. 17, 1987

[51] Int. Cl.$^4$ .................................................. B05D 7/00
[52] U.S. Cl. ...................................... 428/405; 166/280; 427/212; 427/214; 427/221; 428/403; 428/404; 428/406; 428/407
[58] Field of Search ............... 428/403, 404, 405, 406, 428/407; 427/212, 214, 221; 166/280

[56] References Cited

U.S. PATENT DOCUMENTS

| | | | |
|---|---|---|---|
| 3,026,938 | 3/1962 | Huitt et al. | 166/42 |
| 3,506,598 | 4/1970 | Groff et al. | 260/2 |
| 3,929,191 | 12/1975 | Graham et al. | 166/276 |
| 3,935,339 | 1/1976 | Cooke, Jr. | 428/403 |
| 4,102,401 | 7/1978 | Erbstoesser | 166/284 |
| 4,162,165 | 7/1979 | Schwab | 428/403 |
| 4,349,645 | 9/1982 | Griggs | 525/120 |
| 4,397,967 | 8/1983 | McDonald | 428/404 |
| 4,418,161 | 11/1983 | Matsushima et al. | 428/404 |
| 4,443,347 | 4/1984 | Underdown et al. | 427/221 |
| 4,518,039 | 5/1985 | Graham et al. | 166/280 |
| 4,527,627 | 7/1985 | Graham et al. | 166/280 |
| 4,529,751 | 7/1985 | Saeki | 428/404 |
| 4,553,596 | 11/1985 | Graham et al. | 166/297 |
| 4,581,253 | 4/1986 | Evans et al. | 427/221 |
| 4,585,064 | 4/1986 | Graham et al. | 166/280 |
| 4,632,876 | 12/1986 | Laird et al. | 428/403 |
| 4,660,642 | 4/1987 | Young | 166/280 |
| 4,664,819 | 5/1987 | Glaze et al. | 428/403 |
| 4,680,230 | 7/1987 | Gibb et al. | 428/403 |
| 4,733,729 | 3/1988 | Copeland | 166/276 |

OTHER PUBLICATIONS

"ECN 1235, 1273, 1280, 1299 Novolac Epoxy Resins", Resins Department, CIBA-GEIGY Corporation, 1982, Product Data.

"Silane Coupling Agents in Mineral-Filled Composites", Union Carbide Corporation, Mar. 1968, Product Data.

Primary Examiner—George F. Lesmes
Assistant Examiner—James B. Monroe
Attorney, Agent, or Firm—Donald M. Sell; Walter N. Kirn; Douglas B. Little

[57] ABSTRACT

Ceramic particulate useful as a proppant in hydraulic fracturing and in gravel packing operations is provided which comprises a ceramic (sometimes vitreous) core surrounded by an epoxy resin coating. Novolac epoxy resin compounds without any substantial acid soluble filler are used to coat ceramic particulates similar to those disclosed in U.S. Pat. Nos. 4,680,230 and 4,632,876. The result is a product which combines the excellent solvent resistance of the ceramics with the acid resistance of the resin. The resin coating gives the added benefits of lower specific gravity and improved crush resistance.

11 Claims, 1 Drawing Sheet

EPOXY NOVOLAC COATED CERAMIC PARTICULATE

TECHNICAL FIELD

This invention relates to particulate spheroidal ceramics which have been coated with a polymeric resin. The particulate ceramics have utility in oil and gas well services such as hydraulic fracturing and gravel packing.

BACKGROUND

Hydraulic fracturing is a well stimulation technique designed to increase productivity of an oil or gas well by creating highly conductive fractures in the producing geologic formation around the well. The process involves injecting a fluid at a high flow rate and high pressure to rupture the formation and create cracks in the rock and pumping into these cracks a fluid containing a particulate material (propping agent or proppant) to maintain the cracks or fractures open by resisting the forces which tend to close them.

The list of materials used as proppants is rather long and includes sand, metal particles, sintered bauxite, sintered alumina, and refractories such as mullite and glass beads. Generally speaking, lower specific gravity proppants can be carried further into fractures than those of higher specific gravity. Lower specific gravity proppants permit decreases in pumping pressure during proppant placement which reduces bottom hole pressure. In addition, lower proppant density allows for the use of less expensive fracturing fluids.

Gravel packing is a technique used to prevent formation silt from restricting oil or gas flow into the well bore to improve the flow of hydrocarbon into the producing formation or from the formation into the well bore. This can be done by introducing a coarse packing into such wells. It is typically used in deviated wells wherein the well casing is perforated by controlled explosive charge in selected sections. The gravel pack keeps formation sand from flowing back into the perforations created by the explosive charge and yet is porous enough to allow free flow of the oil or gas through the well.

Gravel pack material is desirably strong, low in density, and resistant to solvents and acids. Specifications for gravel pack are given in RP56 and RP58 of the American Petroleum Institute (API). Some ceramics tested for use in gravel packing have degraded over time in the environmental conditions likely to be experienced in deep wells by a phenomenon known as stress corrosion. Many organic coatings which could be applied to ceramics to protect them from down hole conditions are adversely affected by solvents present in crude oil. In addition, many organic (plastic) materials tend to form discontinuous coatings.

Sand is a relatively good gravel pack material except for its high specific gravity of about 2.65. Bauxite and clay compositions have poor mud acid resistance in addition to high specific gravity. Low specific gravity spheres, such as perlite lack mud acid resistance and sufficient strength (crush resistance). Polypropylene and other polymeric spheres tend to deform and compact under pressure, especially at temperatures likely to be found in oil wells, 66° C. or higher.

The ceramic spheroids of U.S. Pat. No. 4,632,876 have been considered for use as a gravel pack. However, the resistance of those embodiments tested to acids such as hydrofluoric and hydrochloric acids is considered too low.

DISCLOSURE OF INVENTION

A means has been found for modifying the spheroids of U.S. Pat. No. 4,632,876 and other ceramic particulates to make them useful in gravel packing and other oil and gas well service applications. The new material may be summarized as coated ceramic spheroids comprising:

(A) ceramic spheroids or particles; and (B) a coating surrounding the ceramic spheroids which coating comprises cured novolac epoxy resin containing less than one weight percent of fillers, such as minerals, which are soluble in aqueous 12:3 molar ratio HCl-HF solutions.

Although the description which follows refers mostly to coated spheroids, it is to be understood that the discussion applies to particles that are not spheroidal in shape.

Novolac epoxy resins are obtained by reaction of novolacs with epichlorohydrin. Novolacs are thermoplastic phenol-formaldehyde type resins typically made through the use of excess phenol and typically having a formula

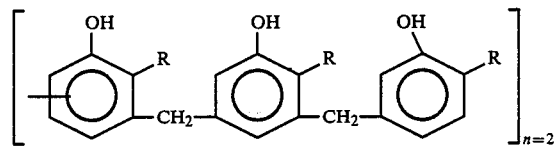

where R is —H or —CH$_3$

The coating of novolac epoxy resin on the fired ceramic spheroids gives the spheroids resistance to HF and HCl and to solvents, such as toluene and kerosene. In addition, the strength of the spheroids is increased, and their specific gravity is reduced. Compounds of the particular class of resins described cover the ceramic spheroids well and adhere well to the base ceramic.

A process for making the coated ceramic spheroids, which will be described hereinafter, is considered part of the invention.

BRIEF DESCRIPTION OF THE FIGURE

The FIGURE is a photomicrograph (180× magnification) of the cross section of a few of the coated ceramic spheroids of this invention. The outer portion labeled C on the spheroid in the middle is the coating of cured novolac epoxy resin.

DETAILED DESCRIPTION

Preferably, the coated ceramic spheroids have the following characteristics:

Specific gravity <2.5, more preferably <2, and even more preferably less than or equal to 1.5 (usual range 1.6–2.0);

Particle size between 0.09 and 5.0 mm (170-4 mesh);

Novolac epoxy resin coating thickness: 5–150 micrometers, more typically 30–80 micrometers;

Novolac epoxy resin coating, weight percent of uncoated ceramic spheroid: 10–60%;

Ceramic spheroids having:
  alumina in an alumina rich outer region at the surface of each spheroid, and a plurality of closed cells or voids within the center or core portion (closed cell microporosity).
Krumbein roundness of 0.8 or higher;
Novolac epoxy resin compound contains less than 0.1% fillers which are soluble in 12:3 molar ratio HCl-HF.
Crush resistance indicated by less than 2 weight percent fines produced in the standard crush resistance test using 13,780 kPa (200 psi) see API Recommended Practice 58 (RP 58), First edition, Mar. 31, 1986, "Recommended Practices for Testing Sand Used in Gravel Packing Operations", Section 8. Mud acid test-less than 4%, preferably less than 2%, acid solubility in 12-3 HCl-HF when tested for such solubility by API Recommended Practices for Testing Sand Used In Hydraulic Fracturing Operations, API RP 56, First edition, March, 1983. The sample being tested is held for one hour in the acid solution at room temperature, instead of 30 minutes at 65.6° C. as stated in the API procedure.

Preferably, the ceramic spheroids of Part (A) are made of a fired ceramic. Once class of useful fired ceramics is made from raw materials which comprise:

(1) mineral particulates comprising a ceramic which melts below about 1300° C., vitrifies upon cooling, and has a fired density of less than about 2.9 grams per cubic centimeter; and (2) sufficient binder to adhere the mineral particulates together after they have been formed into spheroids but before they have been fired.

Nepheline syenite is one mineral which has been found suitable as the mineral particulate raw material for the ceramic spheroids. A typical composition of nepheline syenite is as follows: 60% Orthoclase, 10% Nepheline, 10% Hornblende, 5% Diopside, 15% accessory minerals (titanite, apatite, magnetite and biotite) and tract amounts of secondary minerals (e.g. kaolinite and analcite). Other examples of minerals which may be used are: basalt, feldspar, shale, argillite, pyroxene and mixtures thereof.

The mineral particulate can include at least one constituent having chemically bound water, or sulphur in a form which is not substantially water soluble, in amounts sufficient to yield 0.5 to 5.0 weight percent water or 0.04 to 2.0 weight percent sulphur in the total mass of mineral particulates. The term chemically bound means chemically a part of the mineral and capable of being released upon dissociation of the mineral at or about red heat. An example of chemically bound water is water of hydration. An example of chemically bound sulphur is sulphur atoms which are part of the mineral compound or crystal lattice. The term "substantially water soluble" as applied to chemically bound sulphur means having a solubility in water at room temperature similar to or greater than that of sodium sulfate or potassium sulfate.

In addition to the previously described composition, another example of a suitable mineral particulate comprises: 75% plagioclase and orthoclase, and 25% of the minerals pyroxene, hornblende, magnetite and quartz of which magnetite is less than 5%. Byproduct mineral fines of perlite can also function as the mineral particulate. Minerals containing chemically bound water or sulphur which are useful components of the mineral particulate are: hornblende, apatite, biotite, pyrite, vermiculite, and perlite.

Blast furnace slags, power plant slags and flyash can be used but may not be acceptable because their high iron oxide contents result in high densities. Iron oxide content of the mineral particulate is preferably substantially less than 9 weight percent, more preferably less than 5%.

Binders useful in this invention are: bentonite (preferably sodium bentonite), sodium silicate, cellulose gum, sodium lignosulphoneat, starch, polyvinyl alcohol, polyvinyl acetate, and clay.

The mixture of mineral particulate and binder may be mixed with alumina, typically in a weight ratio of up to about 150 parts by weight per 100 parts mineral particulate.

The novolac epoxy resin used in developing this invention was an epoxy cresol novolac having the formula:

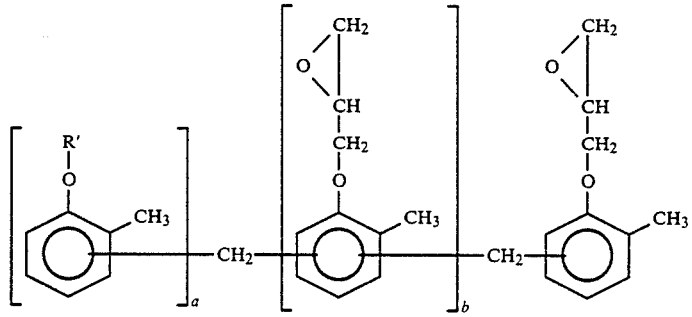

wherein R' represents chlorohydrin, glycol, and/or polymeric ether moieties and was obtained from Ciba-Geigy Co. as ECN 1280 resin. The manufacturer's literature for this compound states that it is derived from orthocresolformaldehyde novolac reacted with epichlorohydrin to form a polyepoxide. Other properties of the resin are: molecular weight about 1170, epoxide equivalent weight 217-236, melting point 78°-99° C., melt viscosity 5000-15000 cps at 120° C., and epoxy functionality 4.1. The dust of this resin may be explosive, and appropriate safety precautions should be taken in handling it.

The fired ceramic spheroids may be made by a process comprising several steps. In the first step, binder, mineral particulate, water, and optionally alumina and/or silicon carbide (typically 0.1-50 and more usually 1-2 parts by weight SiC per 100 parts mineral particulate) are mixed and pelletized in order to form spheroid particles. Suitable mixing pelletizing apparatus are balling pans and machines known as mix pelletizers, such as the Littleford mixer and the Eirich machine.

The Eirich machine is described in U.S. Pat. No. 3,690,622. It comprises a rotatable cylindrical container the central axis of which is at an angle to the horizontal, one or more deflector plates, and at least one rotatable impacting impeller usually located below the apex of the path of rotation of the cylindrical container. The rotable impacting impeller engages the material being mixed and may rotate at a higher angular velocity than the rotatable cylindrical container.

The following sequence occurs in the mix pelletizer: (1) mixing the dry powder raw materials at high speed; (2) nucleation or seeding at which time water is added near the impacting impeller; (3) growth of the spheroids during which the impacting impeller rotates at slower speed than during the nucleation step; and (4) polishing or smoothing the surfaces of the spheroids by turning off the impacting impeller and allowing the cylindrical container to rotate. The amount of binder generally comprises about 0.1 to 5 weight percent of the dry materials fed to the mix pelletizer.

The wet spheroids or prill are discharged from the mix pelletizer and dried at a temperature of about 40°-200° C. The dried spheroids are then typically screened to obtain the desired mesh size. Particle size range selected at this point is usually larger than the final desired product size because of shrinkage of the spheroids during firing. However, when SiC and the chemically bound water or sulpher are present, selected particle size is smaller than final size because of expansion of the spheroids (increasing internal porosity) during firing.

The spheroids are next mixed with a parting agent which is typically alumina, although other parting agents such as zircon and talc may be used at least in part. Silica may be used, but it poses the possible danger of silicosis to workers handling the material. One may use alumina of two particle size distributions, one very fine to coat the spheroids and a coarser alumina to act as inert spacers between spheroids and aid in the flow of material through the kiln. The spheroids and parting agent may be mixed in a tumbling mixer such as a twin shell blender or cement mixer.

Next, the mixture of parting agent and spheroids is fed, typically by means of a vibratory feeder, to a rotary kiln. The amount of parting agent may range between about 5 and 40 weight percent of material fed to the kiln. The function of the parting agent is to prevent the spheroids from agglomerating or sticking to the kiln walls during the vitrification or firing step, and the correct amount to accomplish this is determined by trial and error. The alumina parting agent forms an outer layer or region rich in alumina concentration. The material remains in the kiln for sufficient time to vitrify the mineral particulate.

The residence time of the spheroids in the kiln during firing is dependent upon several parameters: kiln length, diameter, angle, and rotational speed, feed rate to the kiln temperature within the kiln, and particle size of the spheroids. Residence time is adjusted to achieve desired properties. A typical residence time in the kiln corresponds to 10-20 minutes or more.

Firing temperature is generally below 1450° C., usually 1100°-1300° C., preferably 1100°-1240° C. It is preferred to cure at the lower temperatures (about 1120° C.) which may require longer residence times.

The product from the kiln is screened to obtain the desired particle size fraction. Either before, during or after this screening step, the spheroids may be subject to vigorous agitation by air or some other agitation means in order to remove dust from their surfaces. Afterward, the spheroids may be mixed with parting agent and passed through the kiln another time to increase the outer alumina layer. Thus, the core of the spheroids made with the mineral particulate and alumina parting agent is mostly vitrified mineral; whereas, the outer region has a high alumina concentration.

Further detail on the manufacture of fired ceramic spheroids can be found in U.S. Pat. Nos. 4,680,230 and 4,632,876. One composition of fired ceramic spheroids used in making this invention utilized the following raw materials:

| | |
|---|---|
| Nepheline syenite (obtained as fines from a quarry near Little Rock, Arkansas by Minnesota Mining and Manufacturing Co. and designated LR fines) | 8000 g. |
| Bentonite Clay (#200) | 207 g. |
| SiC (<8 micrometer particle size) | 59 g. |
| hydrated alumina parting agent | 3% at outer region or surface |

In order to coat the fired ceramic spheroids with resin, they may be placed in a mixer, such as a Hobart mixer available from Hobart Corp. of Minneapolis, Minn. It is a mixer of the type typically used for bread dough having a stationary bowl or vessel and an impeller, shaped somewhat like an anchor, driven by a motor above the bowl. The center of rotation of the impeller is rotated while the impeller itself rotates about its axis. This action causes it to come close to the sides of the bowl.

In the mixer bowl, with the impeller rotating, it is preferred to mix the fired ceramic spheroids with a silane coupling agent, such as gamma-glycidoxypropyltrimethoxysilane

obtained as A187 from Union Carbide Corp. This coupling agent is typically used in amounts of 0.5-1.0 parts by weight per 100 parts fired ceramic spheroids, and its purpose is to facilitate the coating of the spheroids with novolac epoxy resin. The mixing of a 300 g. sample of spheroids with silane coupling agent takes about 1 minute after the addition of the silane. They are then placed in an oven at about 150° C. for about 15-35 minutes.

The hot spheroids are placed in the mixer bowl and stirred at low speed while adding a novolac epoxy resin compound which can be made of the following ingredients:

| | parts by weight |
|---|---|
| epoxy cresol novolac resin as previously described | 14.056 |
| TiO$_2$ | 0.412 |
| Chrome oxide | 1.204 |
| flow control agent (obtained as Modoflow II from Monsanto Co.) | 0.170 |
| Catalysts | |
| stannous octoate | 0.100 |
| tetrahydro phthalic anhydride | 0.100 |
| Curative | |
| Diaminodiphenyl sulfone | 3.836 |
| Hindered nitrogen-containing compound, e.g. | |
| N,N—diethylaniline | 0.03 |
| fluidizing aid (e.g. Cab-O-Sil silica from | |

| | parts by weight |
|---|---|
| Cabot Corp.) | 0.09 |

The hindered nitrogen compound is to increase the flow of the epoxy novolac resin around the surfaces of the spheroids, and such compounds are generally discussed in U.S. Pat. No. 4,349,645. Another compound useful for this purpose is imidazole.

The flow property of a resin compound can be measured by the pill flow test described in that patent at Column 6, lines 41–54. A 0.9 g specimen of the compound is pressed into a disc or pill 12.5 mm diameter. The pill is placed on a horizontal glass plate in an oven at 150° C. After 35 seconds, the plate is tilted to a 63° angle. The pill melts and flows until cured to the point at which flow ceases. The length of the pill after flowing is called pill flow.

The specific gravity of such resin compound is 1.3–1.5, and 75% of its particles are preferably less than 44 micrometers in size.

The resins specified herein can be compounded to have a Knoop hardness greater than 50. Knoop hardness of the cured epoxy cresol novolac compound has been measured at 200 using a 500 g weight on the knoop indenter (ASTM test D 1474). Known cured epoxy resin coatings typically have a Knoop hardness of 10–20.

For a batch based on 300 g of 850/425 micrometer (20/40 mesh) fired ceramic spheroids, about 60 g of the above epoxy cresol novolac resin compound is added in equal aliquots of 30 g each. After the first aliquot of resin compound powder is added, the mixer speed is increased to number 2 on the Hobart machine, and two 1500W heat lamps, pointed at the inside of the mixer bowl, are turned on to raise temperature to approximately 130°–180° C. in the bowl. In about 2.0–10 minutes, the resin compound melts, flows around the spheroids, and coats them. Volatiles given off escape through an exhaust hood. Early in the coating period, the mass of spheroids and resin appear lumpy and tacky, but the end product is relatively free flowing. The second aliquot of resin compound is coated onto the spheroids in the same manner; however, the time required may be somewhat less. In addition, because of the greater surface area to be covered, smaller spheroids will require relatively more novolac epoxy resin compound on a weight ratio basis, and coarser spheroids will require less resin compound to attain desired coating thickness.

The coated spheroids are then removed from the mixer bowl and held at elevated temperature (e.g. 200°–250° C.) for about 1–1.5 hours, for example in an oven, to cure the resin coating. Longer cure times appear to yield product which is more resistant to weight loss from exposure to solvents such as toluene.

Data for one embodiment of the coated ceramic spheroids (made as described above with the fired ceramic spheroids and the epoxy cresol novolac compound described) and for uncoated fired ceramic spheroids is as follows:

| | Novolac Coated Spheroids | Uncoated Spheroids |
|---|---|---|
| Particle Size | 850/425 micrometers | |
| Specific Gravity | 1.79 | 2.2 |
| Crush Resistance | 1.2% | 17% |
| Mud Acid Resistance | 1.6% | 8% |

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. Coated ceramic particulate comprising:
   (A) fired ceramic particles made from raw materials which comprise:
      (1) mineral particulates comprising a ceramic which melts below 1300° C., vitrifies upon cooling, and has a fired density of less than about 2.9 grams per cubic centimeter; and
      (2) sufficient binder to adhere the mineral particulates together after they have been formed into spheroids but before they have been fired; and
   (B) a coating 5 to 150 micrometers thick surrounding the ceramic particles which coating comprises cured epoxy cresol novolac resin containing less than one weight percent of fillers which are soluble in aqueous 12:3 molar ratio HCl-HF solutions.

2. The coated ceramic particulate of claim 1 wherein the epoxy cresol novolac resin coating of part (B) has a Knoop hardness greater than 50.

3. The coated ceramic particulate of claim 1 wherein the epoxy cresol novolac resin has the following formula before curing:

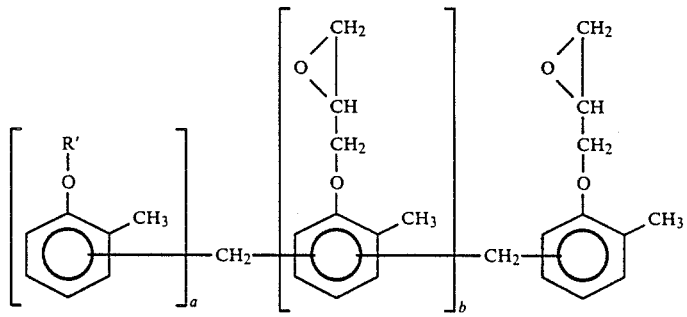

wherein R' is selected from the group consisting of chlorohydrins, glycols, and polymeric ethers.

4. The coated ceramic particulate of claim 1 having a specific gravity less than 2.5.

5. The coated ceramic particulate of claim 1 having a particle size between 0.09 and 5.0 mm.

6. The coated ceramic particulate of claim 1 wherein the thickness of the epoxy cresol novolac coating is between 30 and 80 micrometers.

7. The coated ceramic particulate of claim 1 wherein the mineral particulates are selected from the group consisting of nepheline syenite, basalt, feldspar, shale, argillite, pyroxene, perlite, mixtures of the foregoing, and a blend of 75% plagioclase and orthoclase, and 25% of a mixture of pyroxene, hornblende, magnetite and quartz of which magnetite is less than 5%.

8. The coated ceramic particulate of claim 1 wherein the mineral particulate includes at least one constituent having chemically bound water or sulphur.

9. The coated ceramic particulate of claim 1 wherein the fired ceramic spheroids contain silicon carbide.

10. The coated ceramic particulate of claim 1 wherein the fired ceramic spheroids of part (A) have an outer region rich in alumina concentration.

11. The coated ceramic particulate of claim 1 which further comprises a silane coupling agent coated on the fired ceramic spheroids.

* * * * *